(12) United States Patent
Iketaki et al.

(10) Patent No.: US 9,310,595 B2
(45) Date of Patent: Apr. 12, 2016

(54) SUPER-RESOLUTION MICROSCOPE

(71) Applicant: OLYMPUS CORPORATION, Tokyo (JP)

(72) Inventors: Yoshinori Iketaki, Tokyo (JP); Nandor Bokor, Budapest (HU)

(73) Assignee: OLYMPUS CORPORATION, Tokyo (JP)

( * ) Notice: Subject to any disclaimer, the term of this patent is extended or adjusted under 35 U.S.C. 154(b) by 471 days.

(21) Appl. No.: 13/847,598

(22) Filed: Mar. 20, 2013

(65) Prior Publication Data

US 2014/0285881 A1 Sep. 25, 2014

(30) Foreign Application Priority Data

Mar. 19, 2013 (JP) ................. 2013-055930

(51) Int. Cl.
*G02B 21/00* (2006.01)
*G02B 5/30* (2006.01)

(52) U.S. Cl.
CPC .......... *G02B 21/0056* (2013.01); *G02B 5/3083* (2013.01); *G02B 21/0076* (2013.01)

(58) Field of Classification Search
None
See application file for complete search history.

(56) References Cited

U.S. PATENT DOCUMENTS

| | | | |
|---|---|---|---|
| 6,667,830 B1 | 12/2003 | Iketaki et al. | |
| 6,844,963 B2* | 1/2005 | Iketaki et al. | 359/368 |
| 6,859,313 B2* | 2/2005 | Iketaki et al. | 359/385 |
| 7,551,350 B2* | 6/2009 | Iketaki et al. | 359/385 |
| 8,947,658 B2* | 2/2015 | Iketaki et al. | 356/301 |
| 2010/0014156 A1 | 1/2010 | Iketaki | |
| 2011/0140000 A1 | 6/2011 | Iketaki | |
| 2011/0310475 A1 | 12/2011 | Iketaki | |
| 2015/0226950 A1* | 8/2015 | Booth | G01N 21/6456 250/459.1 |

FOREIGN PATENT DOCUMENTS

| | | |
|---|---|---|
| DE | 199 80 759 T1 | 10/2001 |
| JP | 2004-238688 A | 8/2004 |
| JP | 2008-58003 A | 3/2008 |

(Continued)

OTHER PUBLICATIONS

Iketaki, Y., "Three-Dimensional Super Resolution Microscope Using Two-Color Annular Phase Plate", Applied Physics Express 3 (2010) pp. 085203-1 to 085203-3.

Iketaki, Y., et al. "Development of Super-Resolution Microscopy—Application of Laguerre-Gaussian Beam to Microscopy-", Topologica vol. 2, (2009), pp. 009-1 to 009-6.

(Continued)

*Primary Examiner* — Derek S Chapel
(74) *Attorney, Agent, or Firm* — Scully, Scott, Murphy & Presser, P.C.

(57) ABSTRACT

A super-resolution microscope comprises: an illumination optical system that condenses a first illumination light beam for exciting the molecule from a stable state to a first quantum state and a second illumination light beam for further transitioning the molecule onto a sample in a manner that the first and the second illumination light beams are partially overlapped; a scanning section that scans the sample by relatively displacing the first and the second illumination light beams and the sample; a detection section that detects an optical response signal emitted from the sample; and a phase plate that is arranged in the illumination optical system and has M surface areas for modulating the phase of the second illumination light beam, wherein the phase plate comprises a monolayer optical thin film with M surface areas formed on an optical substrate with a thickness that satisfies the predetermined conditional expression.

6 Claims, 17 Drawing Sheets

(56) References Cited

FOREIGN PATENT DOCUMENTS

| JP | 2010-15026 A | 1/2010 |
|---|---|---|
| JP | 2011-123314 A | 6/2011 |
| JP | 2012-98692 A | 5/2012 |

OTHER PUBLICATIONS

Iketaki, Y., et al., "Investigation of the Center Intensity of First-and Second-Order Laguerre-Gaussian beams with linear and Circular Polarization", Optics Letters (2007), vol. 32(16), pp. 2357-2359.

Jahn, K. and Bokor, N., "Solving the Inverse Problem of High Numerical Aperature Focusing Using Vector Slepian Harmonics and Vector Slepian Multipole Fields", Optics Communications 288 (2013), pp. 13-16.

Bokor, N. and Davidson, N., "Toward a Spherical Spot Distribution with 4 π Focusing of Radially Polarized Light", Optics Letters (2004), vol. 29 (17), pp. 1968-1970.

Bokor, N. and Davidson, N., "Generation of a Hollow Dark Spherical Spot by 4 π Focusing of Radially Polarized Laguerre-Gaussian Beam", Optics Letters (2006), vol. 31(2), pp. 149-151.

* cited by examiner

SUPER-RESOLUTION MICROSCOPE

CROSS-REFERENCE TO RELATED APPLICATION

The present application claims priority from Japanese Application No. 2013-55930, filed on Mar. 19, 2013, the content of which is incorporated herein by reference.

TECHNICAL FIELD

The present invention relates to a super-resolution microscope.

BACKGROUND ART

A super-resolution microscope has been recently developed which is based on spectroscopic processes inducing the fluorescence depletion effect by two-color laser light (see, for example, Patent Document 1). In such a super-resolution microscope, it is essential to use a two-color phase plate which does not modulate the phase of a pump beam (first illumination light beam) but can modulate only an erase beam (second illumination light beam). Only one phase plate is required to be inserted into an optical system of a commercially available laser microscope to focus the pump and erase beams onto a sample without misalignment, which makes it possible to achieve spatial super-resolution corresponding to design values without the need for complicated optical adjustment.

RELATED ART DOCUMENT

Patent Document

Patent Document 1: JP 2011-123314 A

SUMMARY OF INVENTION

The super-resolution microscope disclosed in Patent Document 1 uses a two-color phase plate formed by a multilayer film. For this reason, in particular, if a pupil plane is divided into a plurality of areas and each of them is coated with a differently designed multilayer film, it is difficult to control the film thickness of each area. As a result, it is assumed that each area has a different spectral transmittance of pump and erase beams, which causes distortion of a focused beam shape such that the spatial resolution corresponding to designed values cannot be achieved. If the phase plate is applied to a confocal microscope to achieve super-resolution, fluorescence passing through the phase plate would be detected. However, it is assumed that the coated multilayer film generally reduces the transmittance of the fluorescent band, which leads to reduction of detection sensitivity.

A first aspect of the invention is a super-resolution microscope for observing a sample containing a molecule having at least two or more excited quantum state comprising:

an illumination optical system that condenses a first illumination light beam for exciting the molecule from a stable state to a first quantum state and a second illumination light beam for further transitioning the molecule to another quantum state onto a sample in a manner that the first illumination light beam and the second illumination light beam are partially overlapped with each other so as to irradiate the sample with the first illumination light beam and the second illumination light beam;

a scanning section that scans the sample by relatively displacing the first illumination light beam and the second illumination light beam and the sample;

a detection section that detects an optical response signal emitted from the sample in response to irradiation of the first illumination light beam and the second illumination light beam; and a phase plate that is arranged in an optical path of the illumination optical system through which the first illumination light beam and the second illumination light beam pass and has a plurality M of surface areas for modulating the phase of at least a portion of the second illumination light beam, wherein the phase plate comprises a monolayer optical thin film with the plurality M of surface areas formed on an optical substrate in a thickness that satisfies the following conditional expression:

$$\frac{2\pi}{\lambda_e}(n_e - 1) \cdot d_i = \frac{2i\pi}{M} + 2m_i\pi$$

$$\frac{2\pi}{\lambda_p}(n_p - 1) \cdot d_i = \Psi_i + 2l_i\pi$$

$$|\Psi_i| \le \frac{\pi}{4}$$

where $d_i$ is the thickness of the optical thin film formed on the ith surface area, $\lambda_p$ is the first illumination light beam wavelength, $\lambda_e$ is the second illumination light beam wavelength, $n_p$ is the refractive index of the first illumination light beam in the optical thin film, $n_e$ is the refractive index of the second illumination light beam in the optical thin film, $m_i$ and $l_i$ are integers characterizing the thickness of the optical thin film formed on the ith surface area, and $\Psi$ represents a constant phase shift.

Further, a second aspect of the invention is a super-resolution microscope for observing a sample containing a molecule having at least two or more excited quantum state comprising:

an illumination optical system that condenses a first illumination light beam for exciting the molecule from a stable state to a first quantum state and a second illumination light beam for further transitioning the molecule to another quantum state onto a sample in a manner that the first illumination light beam and the second illumination light beam are partially overlapped with each other so as to irradiate the sample with the first illumination light beam and the second illumination light beam;

a scanning section that scans the sample by relatively displacing the first illumination light beam and the second illumination light beam and the sample;

a detection section that detects an optical response signal emitted from the sample in response to irradiation of the first illumination light beam and the second illumination light beam; and a phase plate that is arranged in an optical path of the illumination optical system through which the first illumination light beam and the second illumination light beam pass and has a plurality M of surface areas for modulating the phase of at least a portion of the second illumination light beam, wherein the phase plate is formed by etching an optical substrate to have the plurality M of surface areas with a thickness that satisfies the following conditional expression:

$$\frac{2\pi}{\lambda_e}(n_e - 1) \cdot d_i = \frac{2i\pi}{M} + 2m_i\pi$$

$$\frac{2\pi}{\lambda_p}(n_p - 1) \cdot d_i = \Psi_i + 2l_i\pi$$

$$|\Psi_i| \le \frac{\pi}{4}$$

where $d_i$ is the thickness of the substrate that remains after etching of the ith surface area, with the surface area which is the most deeply etched being a base level, $\lambda_p$ is the first illumination light beam wavelength, $\lambda_e$ is the second illumination light beam wavelength, $n_p$ is the refractive index of the first illumination light beam in the optical substrate, $n_e$ is the refractive index of the second illumination light beam in the optical substrate, $m_i$ and $l_i$ are integers characterizing the thickness of the substrate that remains after etching of the ith surface area, and $\Psi$ represents a constant phase shift.

Further, a third aspect of the invention is a super-resolution microscope for observing a sample containing a molecule having at least two or more excited quantum state comprising:

an illumination optical system that condenses a first illumination light beam for exciting the molecule from a stable state to a first quantum state and a second illumination light beam for further transitioning the molecule to another quantum state onto a sample in a manner that the first illumination light beam and the second illumination light beam are partially overlapped with each other so as to irradiate the sample with the first illumination light beam and the second illumination light beam;

a scanning section that scans the sample by relatively displacing the first illumination light beam and the second illumination light beam and the sample;

a detection section that detects an optical response signal emitted from the sample in response to irradiation of the first illumination light beam and the second illumination light beam; and a phase plate that is arranged in an optical path of the illumination optical system through which the first illumination light beam and the second illumination light beam pass and has a modulation area for modulating a phase of at least a portion of the second illumination light beam, wherein the phase plate comprises a monolayer optical thin film with the modulation area formed on an optical substrate, the optical thin film having a reflective effect or a transmissive effect on the first illumination light beam, and having a transmission-type phase modulation effect on the second illumination light beam.

DESCRIPTION OF THE EMBODIMENT

Figure 1:
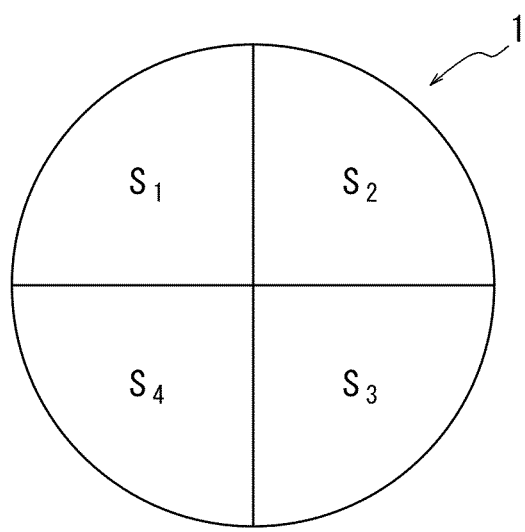
FIG. 1 is a diagram for explaining the configuration of a single-layer two-color spiral phase plate used for a super-resolution microscope according to one embodiment.

Hereinafter, the invention will be described taking a super-resolution microscope utilizing a fluorescence depletion effect as an example.

Super-resolution fluorescence depletion microscopy is a powerful analysis method with a spatial resolution that can overcome the diffraction limit. Its basic idea is that a doughnut-shaped erase beam (second illumination light beam) with a dark spot is focused sharply by a high numerical-aperture (NA) objective lens onto the fluorescence sample, together with a sharply focused Gaussian pump beam (first illumination light beam), and fluorescence is depleted in regions where the two beams overlap. Since the super-resolution fluorescence depletion microscopy is a highly nonlinear process, the fluorescent spot irradiated only with the pump beam can be significantly smaller than the diffraction limit imposed by linear optics.

The performance of a super-resolution fluorescence depletion microscope system depends crucially on the following factors (1) and (2).

(1) The intensity of a dark point of the erase spot at a geometrical focus must be as close to zero as possible, because a residual erase beam intensity at the focus can significantly reduce the signal-to-noise ratio of the fluorescence signal. As was demonstrated both theoretically and experimentally, a left-circularly polarized Laguerre-Gaussian helical beam with a topological charge of +1 yields a cylindrically symmetric, sharp bright ring at the focal plane with a perfect zero at the geometrical focus for arbitrarily high NA. Such a beam is therefore ideally suited as the erase beam in the super-resolution fluorescence depletion microscope, and can be easily generated by passing a circularly polarized Gaussian beam through a spiral phase plate. This helicity and polarization was chosen for the erase beam in the following numerical simulations and experiments.

(2) The pump and erase beams should be aligned with an optical axis of an objective lens within interferometric precision. This can lead to great technical difficulties in microscope systems where the pump and erase beams—which have different spatial structures—are created at separate locations of the setup, follow different optical paths and are then recombined by a beam splitter in front of the objective lens.

One technique to overcome this problem is to design a single optical element that affects the erase and pump beams differently. At the erase wavelength it acts as a spiral phase plate and creates a helical beam, but at the pump wavelength it leaves the Gaussian beam profile unaffected. If such an optical element is placed in front of the objective lens, it can be illuminated by Gaussian pump and erase beams that are derived from the same optical fiber, thus eliminating the need for the separate alignment of the pump and erase beams. In addition, this method yields a very compact system and can be easily implemented in a commercially available fluorescence microscope.

For the single compact optical element, we have previously proposed two solutions. The basic idea of the first solution is that the Gaussian pump and erase beams that are derived from the same optical fiber illuminate a compound optical element that consists of an annular color filter and an annular spiral phase plate. Due to the annular geometry, the effective pump and erase beams are separated radially in space, and thus different optical operations cause the erase beam to turn into an annularly shaped Laguerre-Gaussian helical beam, and the pump beam retains its Gaussian profile. The main disadvantage of this method is that neither the erase beam nor the pump beam exploits the entire entrance pupil area and this reduces the effective intensity of both beams. In addition, since the pump beam illuminates only the central portion of the entrance pupil, its effective NA is smaller than that of the objective lens. This leads to an increase in pump spot size over the diffraction limit. Note, however, that this increase in pump spot size has little effect on the spatial resolution of the microscope which is determined mainly by the size of the central dark point of the erase spot.

The second solution is to solve the disadvantage of the first solution by a single-layer two-color spiral phase plate. Here, too, the erase and pump beams are derived from the same optical fiber, but in this case they are not separated radially and both illuminate the entire single-layer two-color spiral phase plate which occupies the entrance pupil in front of the objective lens. In order to approximate a continuous spiral thickness profile, the single-layer two-color spiral phase plate is divided into several surface areas azimuthally. As few as four surface areas can already approximate the desired spiral phase profile to satisfactory accuracy for the purposes of super-resolution fluorescence depletion microscopy. On each surface area, an optical multilayer is deposited on a substrate. The thicknesses and refractive indices of the layers are designed so that at the wavelength of the erase beam the four surface areas add a phase delay of $0, \pi/2, \pi, 3\pi/2$ to the erase beam, respectively, whereas at the wavelength of the pump beam all four surface areas add zero effective phase delay to the pump beam. The erase beam passing through the single-layer two-color spiral phase plate is thus converted into a doughnut-shaped quasi-Laguerre-Gaussian helical beam, but the pump beam passing through the same element retains its Gaussian profile.

Note that wavelength selectivity of the single-layer two-color spiral phase plate is achieved by its multilayer structure. For example, each surface area of the single-layer two-color spiral phase plate consists of four alternating layers of $TiO_2$ and $SiO_2$. This can lead to fabrication difficulties and a cost increase.

In one embodiment of the present invention, we suggest a technique based on a single-layer two-color spiral phase plate as the phase plate for the super-resolution microscope. In the single-layer two-color spiral phase plate, as is the case for a multilayer two-color spiral phase plate, both the erase and pump beams illuminate the entire entrance pupil, and thus the available intensity of both beams can be used efficiently. In addition, in the single-layer two-color spiral phase plate, wavelength selectivity is achieved with a monolayer film, which is considerably easier and cheaper to fabricate than the multilayer two-color spiral phase plate consisting of a multilayer film structure.

Design Considerations for the Single-Layer Two-Color Spiral Phase Plate

FIG. 1 is a diagram for explaining a configuration of the single-layer two-color spiral phase plate used for a super-resolution microscope according to one embodiment of the present invention. The single-layer two-color spiral phase plate 1 shown in FIG. 1 is divided into four surface areas S1 to S4. In order to create a helical erase beam with a topological charge 1, the thicknesses $d_1$, $d_2$, $d_3$ and $d_4$ of the four surface areas S1 to S4 have to satisfy the following requirements:

$$\left. \begin{aligned} \frac{2\pi}{\lambda_e}(n_e - 1) \cdot d_1 &= \Phi + 2m_1\pi \\ \frac{2\pi}{\lambda_e}(n_e - 1) \cdot d_2 &= \Phi + \frac{\pi}{2} + 2m_2\pi \\ \frac{2\pi}{\lambda_e}(n_e - 1) \cdot d_3 &= \Phi + \pi + 2m_3\pi \\ \frac{2\pi}{\lambda_e}(n_e - 1) \cdot d_4 &= \Phi + \frac{3\pi}{2} + 2m_4\pi \end{aligned} \right\} \quad (1)$$

where $\lambda_e$ is a erase wavelength, $n_e$ is a refractive index of the monolayer film at the erase wavelength, $m_1$, $m_2$, $m_3$ and $m_4$ are integers, and $\Phi$ represents a constant phase shift.

At the same time, the pump beam passing through the same four surface areas S1 to S4 must retain its Gaussian profile with 0 topological charge. Thus the thicknesses $d_1$, $d_2$, $d_3$ and $d_4$ of the four surface areas S1 to S4 of the single-layer two-color spiral phase plate have to satisfy the following requirements too:

$$\left. \begin{aligned} \frac{2\pi}{\lambda_p}(n_p - 1) \cdot d_1 &= \Psi_1 + 2l_1\pi \\ \frac{2\pi}{\lambda_p}(n_p - 1) \cdot d_2 &= \Psi_2 + 2l_2\pi \\ \frac{2\pi}{\lambda_p}(n_p - 1) \cdot d_3 &= \Psi_3 + 2l_3\pi \\ \frac{2\pi}{\lambda_p}(n_p - 1) \cdot d_4 &= \Psi_4 + 2l_4\pi \end{aligned} \right\} \quad (2)$$

where $\lambda_p$ is the pump wavelength, $n_p$ is the refractive index of the monolayer film at the pump wavelength, $l_1$, $l_2$, $l_3$ and $l_4$ are integers, and $\Psi_{i=1,2,3,4}$ is a constant phase shift.

One of the two constant phase shifts, $\Phi$ or $\Psi$, can be set to zero without any loss in generality, hence we set $\Phi=0$. Combining equations (1) and (2) we arrive at the following diophantine set of equations:

$$\left. \begin{aligned} \frac{m_1}{p + l_1} &= C \\ \frac{\frac{1}{4} + m_2}{p + l_2} &= C \\ \frac{\frac{1}{2} + m_3}{p + l_3} &= C \\ \frac{\frac{3}{4} + m_4}{p + l_4} &= C \end{aligned} \right\} \quad (3)$$

Here $$C \equiv \frac{\lambda_p(n_e - 1)}{\lambda_e(n_p - 1)}$$

is a constant determined by physical parameters. The unknowns of equations (3) are $$p = \frac{\Psi}{2\pi}$$

(a real number) and the eight integers $m_{1-4}$ and $l_{1-4}$.

Numerical and Experimental Results

The inventors carried out various simulations assuming that the single-layer two-color spiral phase plate shown in FIG. 1 is fabricated by depositing a $SiO_2$ layer on a glass substrate. In the following simulations, the following physical parameters are used: $\lambda_e=0.647$ µm, $\lambda_p=0.532$ µm, $n_e=1.475$ and $n_p=1.479$.

The above equations (3) cannot always be solved exactly. However, as illustrated below, a satisfactory approximate solution can usually be found. Since the quality of the erase spot has a much stronger effect on the super-resolution performance of the super-resolution fluorescence depletion microscope than the quality of the pump spot does, in the approximate solution of equations (3) we specified strict requirements for $m_{1-4}$, whereas the requirements for $l_{1-4}$ were somewhat eased. Namely, the numbers $m_{1-4}$ are exactly integers. Hence the single-layer two-color spiral phase plate 1 adds a perfect helical phase to the erase beam. Meanwhile, we looked for solutions where the numbers $l_{1-4}$ are as close as possible to integer values. Hence the single-layer two-color spiral phase plate 1 adds only a small aberration to the Gaussian pump beam.

Tables 1 to 3 show three simulation results of the single-layer two-color spiral phase plate 1, and present three approximate solutions to equations (3) and the corresponding phase delays (modulo 360°) introduced by the four surface areas S1 to S4 of the single-layer two-color spiral phase plate 1 to the erase and pump beams, respectively.

TABLE 1

| thickness of S1 to S4 | phase delay at $\lambda_e$ | phase delay at $\lambda_p$ |
|---|---|---|
| $d_1 = 0$ μm [$m_1 = 0$] | 0° | 0° = 357.45° + 2.55° |
| $d_2 = 4.427$ μm [$m_2 = 3$] | 90° | 354.90° = 357.45° − 2.55° |
| $d_3 = 3.405$ μm [$m_3 = 2$] | 180° | 23.77° = 357.45° + 26.32° |
| $d_4 = 1.022$ μm [$m_4 = 0$] | 270° | 331.13° = 357.45° − 26.32° |

TABLE 2

| thickness of S1 to S4 | phase delay at $\lambda_e$ | phase delay at $\lambda_p$ |
|---|---|---|
| $d_1 = 5.448$ μm [$m_1 = 4$] | 0° | 326.03° = 323.48° + 2.56° |
| $d_2 = 9.875$ μm [$m_2 = 7$] | 90° | 320.92° = 323.48° − 2.56° |
| $d_3 = 14.302$ μm [$m_3 = 10$] | 180° | 315.82° = 323.48° − 7.66° |
| $d_4 = 1.022$ μm [$m_4 = 0$] | 270° | 331.13° = 323.48° + 7.66° |

TABLE 3

| thickness of S1 to S4 | phase delay at $\lambda_e$ | phase delay at $\lambda_p$ |
|---|---|---|
| $d_1 = 77.640$ μm [$m_1 = 57$] | 0° | 325.87° = 328.5° − 2.63° |
| $d_2 = 52.101$ μm [$m_2 = 38$] | 90° | 327.62° = 328.5° − 0.88° |
| $d_3 = 26.56$ μm [$m_3 = 19$] | 180° | 329.38° = 328.5° + 0.88° |
| $d_4 = 1.022$ μm [$m_4 = 0$] | 270° | 331.13° = 328.5° + 2.63° |

As seen, the phase delays for the erase wavelength always correspond to the exact design values, and hence the helicity condition for the erase beam is satisfied perfectly. On the other hand, the phase delays in the pump wavelength (also expressed in the right columns of Tables 1 to 3 in terms of deviations from the average) introduce an aberration in the Gaussian beam.

The single-layer two-color spiral phase plate having the parameters in Table 3 only extremely small aberrations to the Gaussian pump beam. However, this single-layer two-color spiral phase plate has steep steps between the four surface areas, which can lead to fabrication difficulties. On the other hand, the single-layer two-color spiral phase plate having the parameters in Table 1 is easier to fabricate because the steps between the four surface areas are smaller, but the aberration of the pump beam is larger.

Figure 2A:
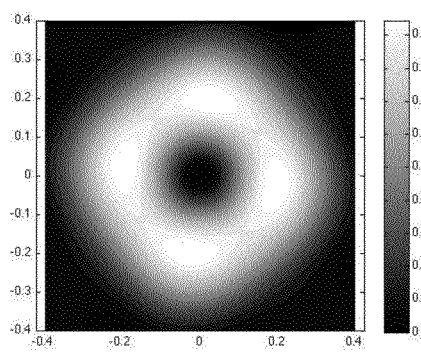
FIGS. 2a and 2b are photographic images illustrating simulation results of focal spot intensity distributions of erase and pump beams by means of the single-layer two-color spiral phase plate having optical properties shown in Table 1.
Figure 2B:
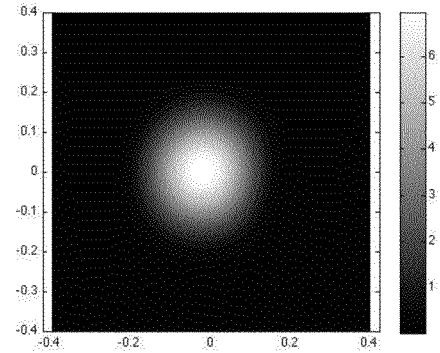
Figure 3A:
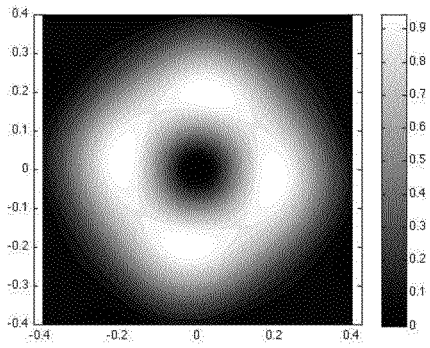
FIGS. 3a and 3b are photographic images illustrating simulation results of the focal spot intensity distributions of the erase and pump beams by means of the single-layer two-color spiral phase plate having optical properties shown in Table 2.
Figure 3B:
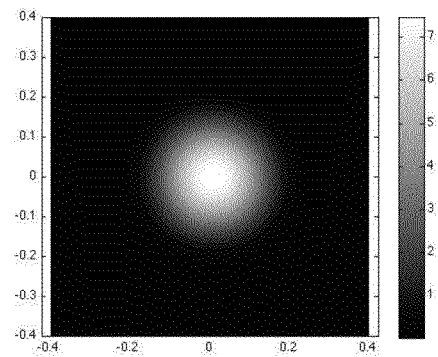
Figure 4A:
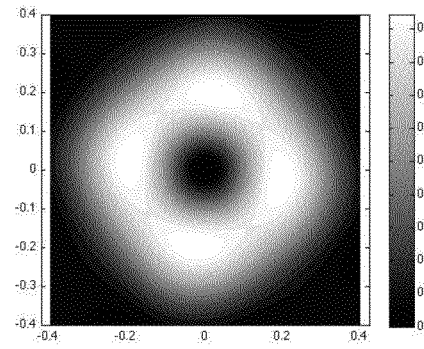
FIGS. 4a and 4b are photographic images illustrating simulation results of the focal spot intensity distributions of the erase and pump beams by means of the single-layer two-color spiral phase plate having optical properties shown in Table 3.
Figure 4B:
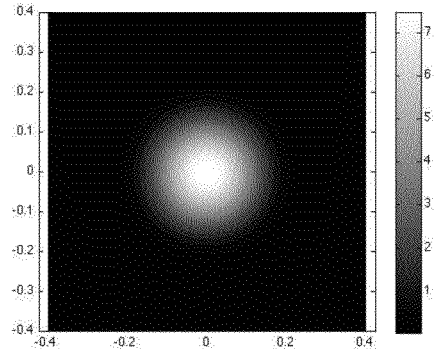
Figure 5A:
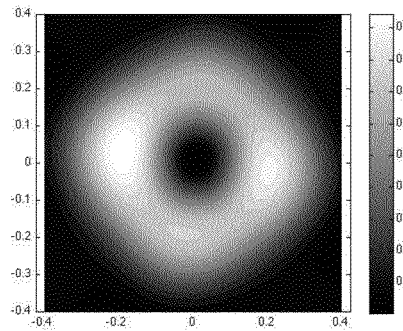
FIGS. 5a and 5b are photographic images illustrating simulation results of the focal spot intensity distributions of the erase and pump beams corresponding to FIGS. 2a and 2b when the single-layer two-color spiral phase plate in FIG. 1 has fabrication errors.
Figure 5B:
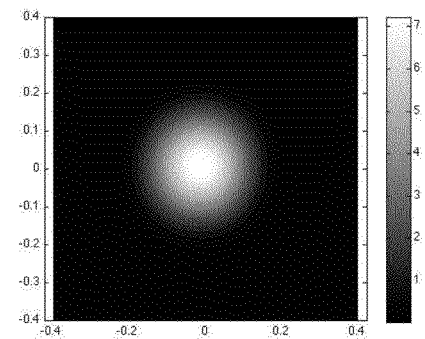
Figure 6A:
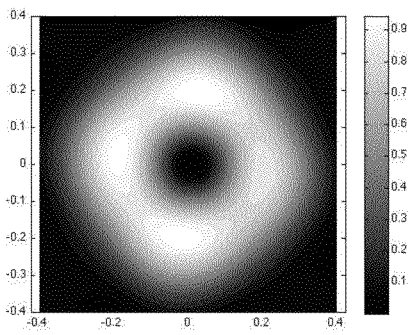
FIGS. 6a and 6b are photographic images illustrating simulation results of the focal spot intensity distributions of the erase and pump beams corresponding to FIGS. 3a and 3b when the single-layer two-color spiral phase plate in FIG. 1 has fabrication errors.
Figure 6B:
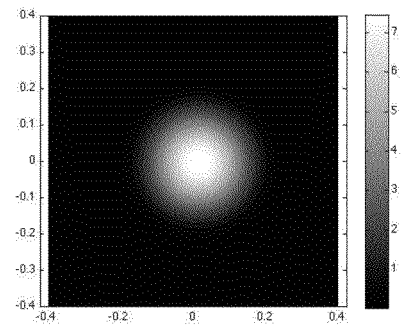
Figure 7A:
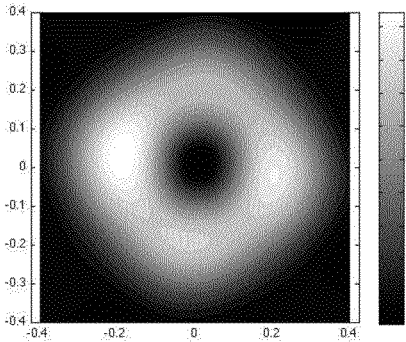
FIGS. 7a and 7b are photographic images illustrating simulation results of the focal spot intensity distributions of the erase and pump beams corresponding to FIGS. 4a and 4b when the single-layer two-color spiral phase plate in FIG. 1 has fabrication errors.
Figure 7B:
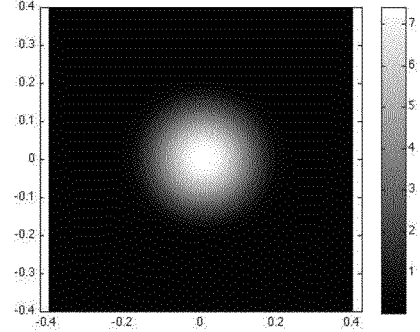

In order to compare the performance of the three single-layer two-color spiral phase plates of Tables 1 to 3, we considered a focusing system that consists of an oil immersion aplanatic microscope objective lens (refractive index of 1.5) with NA=1.4, with the single-layer two-color spiral phase plate placed at the entrance pupil of the objective lens, and calculated the focused erase and pump spot intensity distributions using the generalized Debye-Wolf integral of vectorial diffraction theory. Photographic images obtained from the simulation results are shown in FIGS. 2a to 4b, respectively. FIGS. 2a and 2b correspond to Table 1, FIGS. 3a and 3b correspond to Table 2, and FIGS. 4a and 4b correspond to Table 3. FIGS. 2a, 3a and 4a present the erase intensity distribution and FIGS. 2b, 3b and 4b present the pump intensity distribution.

As is clear from FIGS. 2a to 4b, all cases yield substantially identical erase spots. As seen in FIGS. 3b and 4b, the main effect of the aberration on the pump spot is a slight displacement of the maximum intensity point from the geometrical focus.

Next, we investigated the effect of small fabrication errors on the performance of the single-layer two-color spiral plate. Specifically, when the $SiO_2$ layers are simply deposited on the four surface areas S1 to S4, a random discrepancy in thickness in the order of λ/10 can be expected. In our simulations we thus assumed that the thickness of each surface area has a random deviation from the designed thickness, where the maximum value of the random deviation was set to λ/10. Photographic images of focal spot intensity distributions of typical calculated erase and pump spots, corresponding to each of the cases of FIGS. 2a to 4b, are presented in FIGS. 5a to 7bs, respectively.

As is clear from FIGS. 5a to 7b, the position and the nearly Gaussian shape of the pump spot are largely unaffected by the fabrication error. On the other hand, the erase spot is affected in two ways: (1) an asymmetric distortion is introduced into the bright ring that surrounds the central dark point, and (2) the intensity of the central dark point itself is no longer zero. Both of these effects are expected to impair the super-resolution performance of the microscope.

Figure 8:
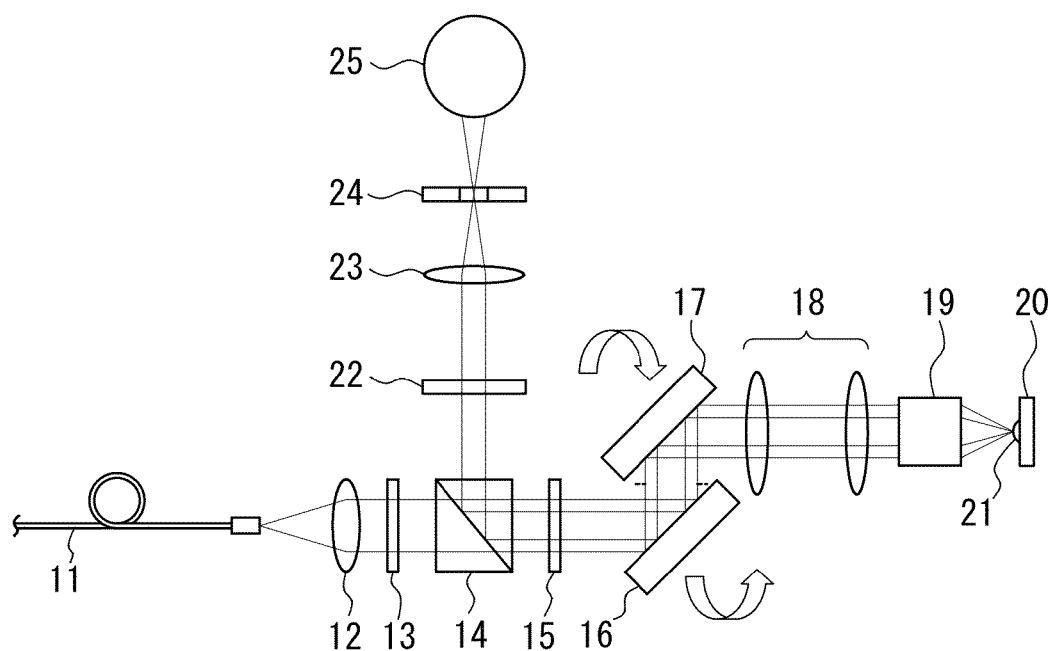
FIG. 8 is a schematic configuration diagram illustrating a super-resolution microscope according to one embodiment.

FIG. 8 is a schematic configuration diagram illustrating a super-resolution microscope according to one embodiment of the present invention. In the present embodiment, the second harmonic ($\lambda_p$=532 nm) of an oscillation wavelength (1064 nm) of a Nd:YVO$_4$ solid-state laser is used for the pump beam. The oscillation wavelength of a Kr laser ($\lambda_e$=647 nm), for example, is used for the erase light. The pump and erase beams are modulated into pulses with a time width of 20 ns at a repetition rate of 5 MHz and introduced into the same single-mode fiber 11.

The linearly polarized pump and erase beams emitted from the single-mode fiber 11 are collimated by a collimator lens 12 into a parallel beam and impinge the single-layer two-color spiral phase plate 15 through a quarter-wave plate 13 and a polarization beam splitter 14. In order to create a quasi-Laguerre-Gaussian erase beam with zero intensity at the geometrical focus, the quarter-wave plate 13 is configured to be rotatable around an optical axis independently from the single-layer two-color spiral phase plate 15 or jointly with the single-layer two-color spiral phase plate 15 as a unit, and can convert the linearly-polarized erase beam into a circularly polarized light. The single-layer two-color spiral phase plate 15 was fabricated by depositing $SiO_2$ layers on four surface areas (as shown in FIG. 1) in a surface of a BK7 glass substrate on the basis of the numerical parameters in Table 1.

After passing through the single-layer two-color spiral phase plate 15, the pump and erase beams are oscillatingly scanned by galvano mirrors 16 and 17 forming a scanning section in a two-dimensional direction, and condensed by an objective lens 19 onto a sample 21 situated on a sample stage 20 through a pupil projection lens system 18. Thus, the single-mode fiber 11, the collimator lens 12, the quarter-wave plate 13, the single-layer two-color spiral phase plate 15, the pupil projection lens system 18 and the objective lens 19 form an illumination optical system. For example, the oil immersion aplanatic microscope objective lens (refractive index of 1.5) with NA=1.4 is used as the objective lens 19. Note that, in order to simplify the drawings, FIG. 8 shows the galvano mirrors 16 and 17 as being capable of oscillating in the same plane.

Meanwhile, light from the sample 21 is collimated by the objective lens 19 and passes through the pupil projection lens 18, the galvano mirrors 17, 16 and the single-layer two-color spiral phase plate 15 and enters the polarization beam splitter 14. After separation of given polarization components at the polarization beam splitter 14, the fluorescence is extracted (transmitted) through a fluorescence separation filter 22. The fluorescence transmitted through the fluorescence separation filter 22 passes through a condenser lens 23 and a confocal pinhole 24, and received by a light detection section 25 consisting of a photomultiplier tube, thereby obtaining a fluorescence image by means of scanning of the galvano mirrors 16 and 17.

In order to confirm optical properties of the single-layer two-color spiral phase plate 15, in the configuration shown in FIG. 8, we measured the pump and erase spot intensity distributions in the focal plane and in two meridional planes orthogonal to the focal plane, using 200 nm diameter fluorescent microbeads (Molecular Probes Inc. F8806) in which both $\lambda_e$ and $\lambda_p$ induces fluorescence as fluorescent molecules of the sample 21.

Figure 9A:
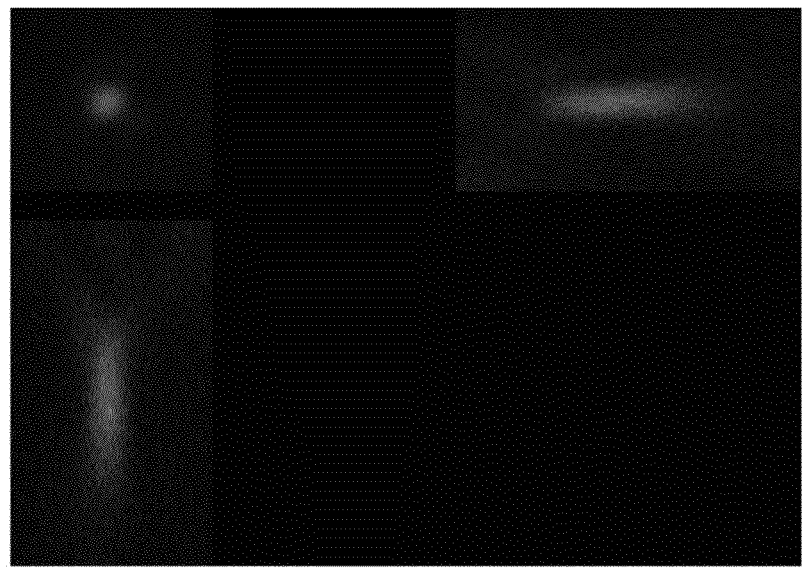
FIGS. 9a and 9b are photographic images illustrating measurement results of the focal spot intensity distributions of the erase and pump beams by means of the super-resolution microscope in FIG. 8.
Figure 9B:
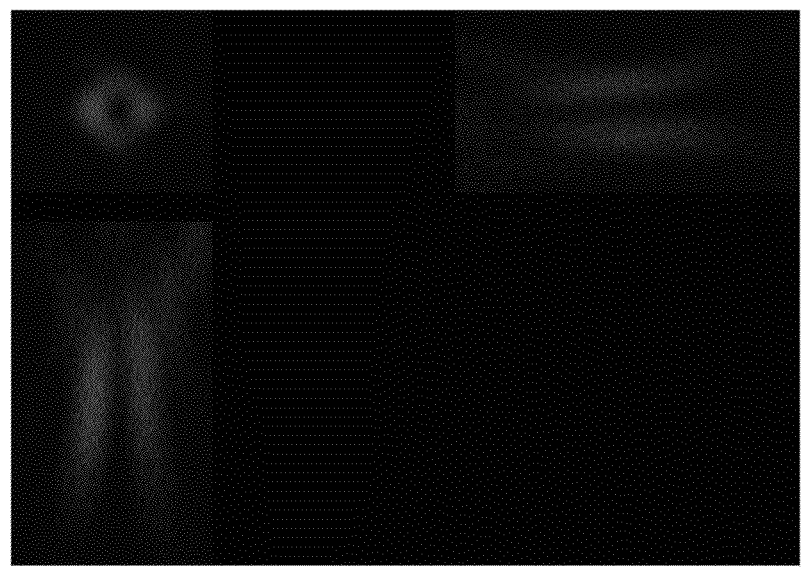
Figure 10A:
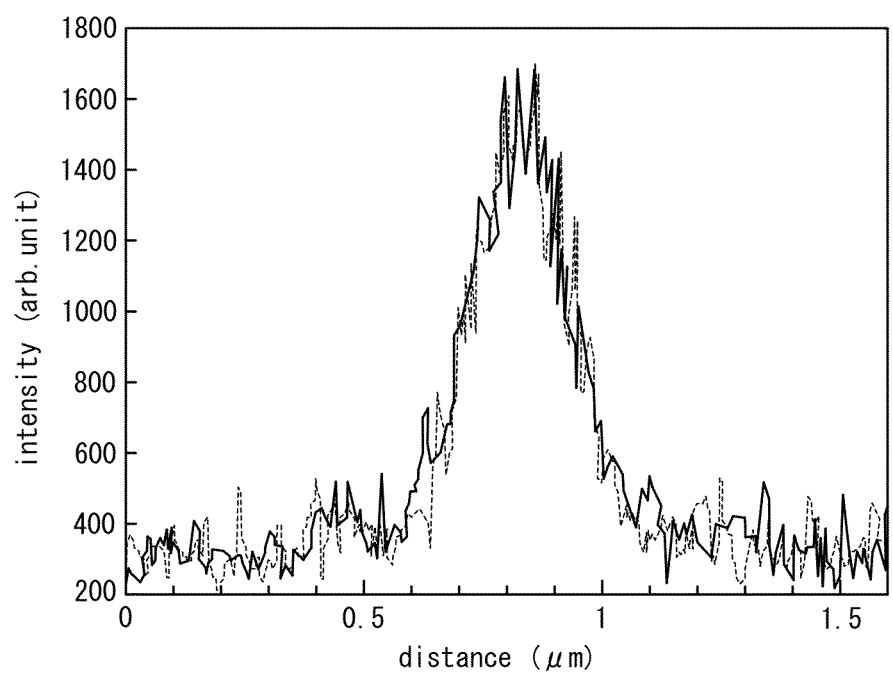
FIGS. 10a and 10b are diagrams illustrating intensity profiles of the pump and erase spots by means of the super-resolution microscope in FIG. 8.
Figure 10B:
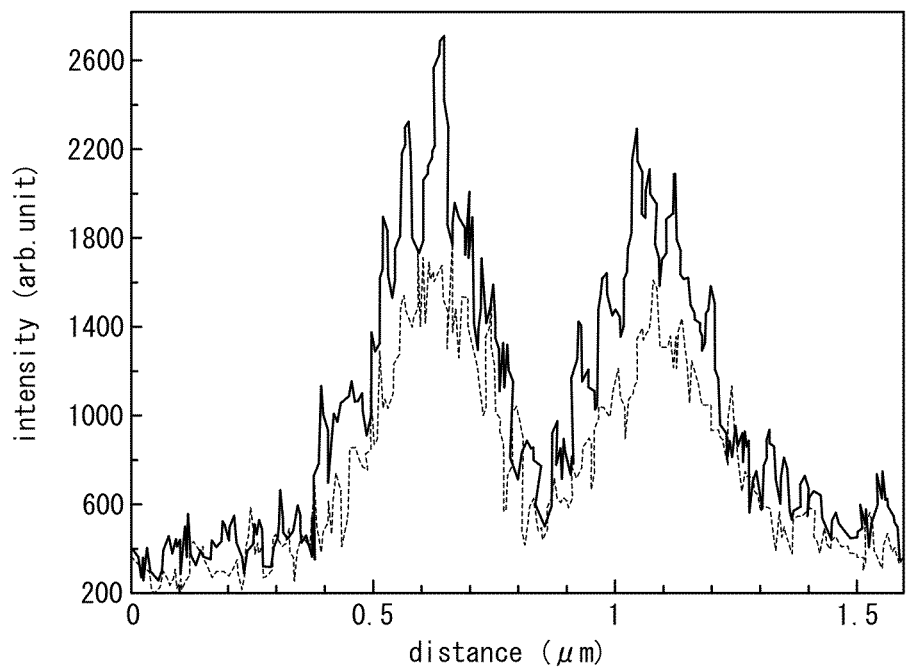

FIGS. 9a to 10b are diagrams illustrating measurement results. FIG. 9a is a photographic image illustrating the pump intensity distribution; the intensity distribution in the focal plane is shown in the upper left, and the intensity distributions in the orthogonal two meridional planes (x- and y-directions) including the optical axis of the pump beam are shown to the right of and under the intensity distribution in the focal plane. FIG. 9b is a photographic image illustrating the erase intensity distribution; likewise the intensity distribution in the focal plane is shown in the upper left, and the intensity distributions in the orthogonal two meridional planes (x- and y-directions) including the optical axis of the pump beam are shown to the right of and under the intensity distribution in the focal plane. FIG. 10a illustrates the intensity profile of the pump beam along the orthogonal x- and y-directions in the focal plane. Likewise FIG. 10b illustrates the intensity profile of the erase beam along the orthogonal x- and y-directions in the focal plane. In FIGS. 10a and 10b, the dashed line represents the intensity profile in the x-direction and the solid line represents the intensity profile in the y-direction.

As is clear from FIGS. 9a to 10b, the measured focal spot intensity distributions are in good agreement with the calculated intensity distributions of FIGS. 2a and 2b. Specifically, a pump spot with a near-Gaussian intensity and a doughnut-shaped erase spot with a central dark point were created. An overlapping image of these two spots (not shown here) indicates that the pump beam was focused onto the central dark point of the erase beam.

In order to measure the super-resolution performance of the super-resolution microscope of FIG. 8, we used 60 nm diameter fluorescent polystyrene beads as fluorescent molecules of the sample 21. The beads contain Nile Red whose fluorescence intensity peak is at 570 nm. Irradiation by the pump beam alone induces fluorescence in it, but simultaneous irradiation with the pump and erase beams leads to efficient fluorescence depletion. Since the size of the fluorescent beads is smaller than the diffraction limit, these beads provide a suitable sample for the demonstration of super-resolution fluorescence depletion microscopy.

The fluorescence point-spread-function (PSF) was first measured by irradiating the sample 21 with the pump beam alone (normal measurement). Next, an image was taken using the pump beam together with the doughnut-shaped erase beam (super-resolution measurement). In the super-resolution measurement, the peak power of the Kr-laser was 45 mW, and the peak intensity of the doughnut-shaped erase spot was estimated to be 8 MW/cm$^2$ in the focal plane. The size of one pixel was 10 nm and the total energy dose of the erase beam for taking one image is 270 nJ per pixel.

Figure 11A:
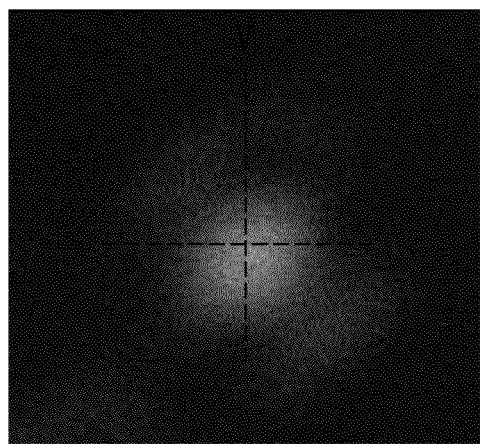
FIGS. 11a and 11b are photographs of normal and super-resolution images of fluorescent polystyrene beads, respectively, by means of the super-resolution microscope in FIG. 8.
Figure 11B:
Figure 12A:
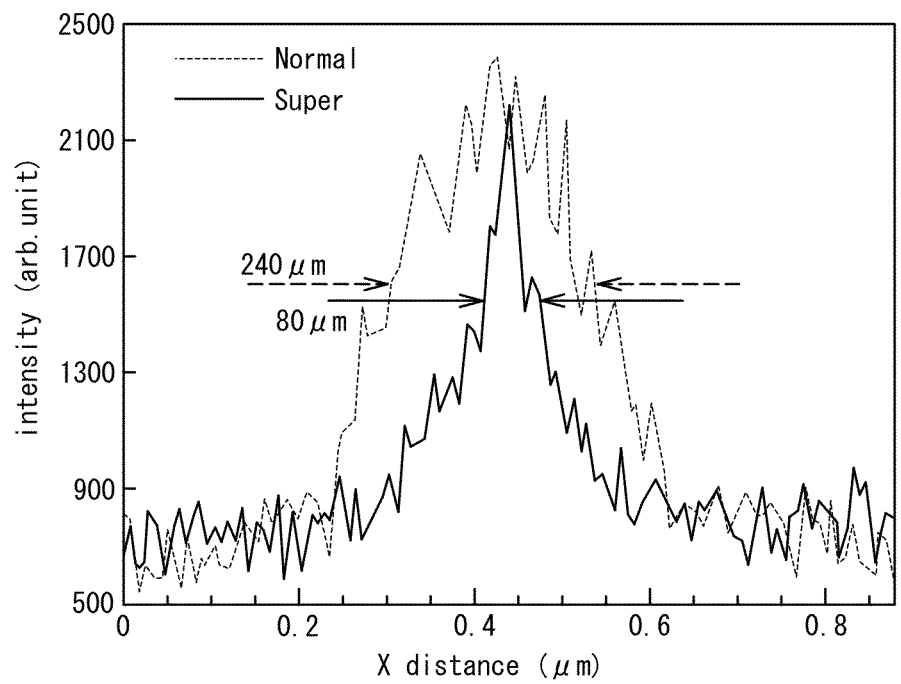
FIGS. 12a and 12b are diagrams illustrating the intensity profiles of FIGS. 11a and 11b.
Figure 12B:
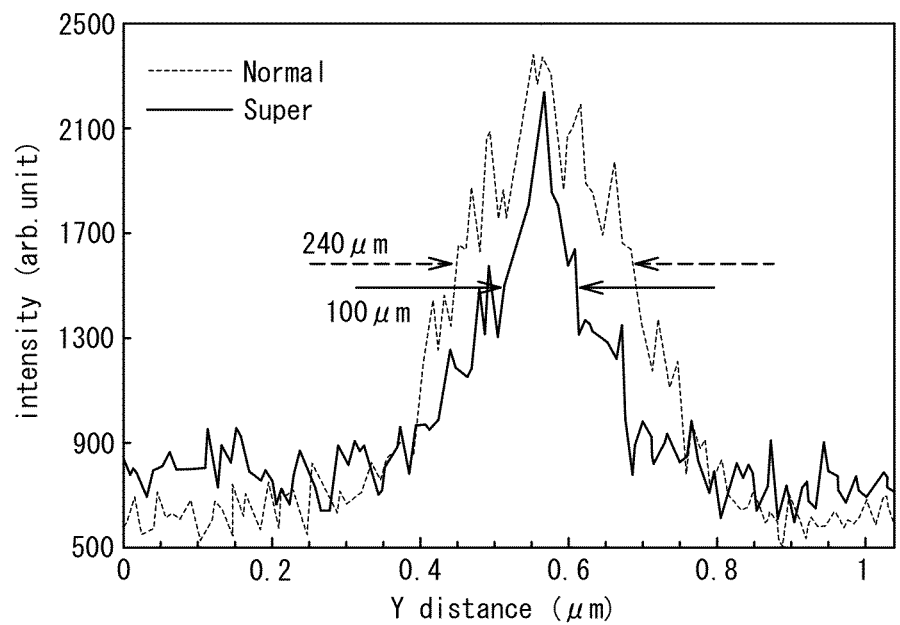

FIGS. 11a and 11b are photographs showing normal and super-resolution images of the 60 nm diameter fluorescent polystyrene beads, respectively. The cross-sectional intensity profiles along x and y axes are shown in FIGS. 12a and 12b, respectively. In the normal measurement indicated by a dashed line (Normal), the PSF of the fluorescent image has a Gaussian profile with a full-width-at-half-maximum (FWHM) of about 240 nm. On the other hand, the PSF of the super-resolution measurement indicated by a solid line (Super) has a Lorentzian profile as predicted by theory and its FWHM is about 80 nm and about 100 nm along the x- and y-axis, respectively. This measurement result shows that the simple single-layer two-color spiral phase plate 15 is suitable for application in a scanning fluorescence microscope and achieving super-resolution.

Further, in order to investigate the fabrication precision of the single-layer two-color spiral phase plate 15 used in the super-resolution microscope of FIG. 8, we estimated the actual thicknesses of the four surface areas S1 to S4 on the single-layer two-color spiral phase plate 15 (see FIG. 1). This was done by measuring the wavelength dependence of the transmittance of each surface area and fitting the obtained data with theoretical curves. The measured average thicknesses for the four surface areas are given in Table 4. Also given in Table 4 are the actual phase delays at the erase and pump wavelengths, respectively, calculated from the measured average thicknesses.

TABLE 4

| measured thickness of S1 to S4 | phase delay at $\lambda_e$ | phase delay at $\lambda_p$ |
|---|---|---|
| $d_1 = 0$ μm | 0° | 0° = 25.84° − 25.84° |
| $d_2 = 4.6049$ μm | 137.06° | 52.61° = 25.84° + 26.77° |
| $d_3 = 3.5286$ μm | 212.60° | 63.74° = 25.84° + 37.90° |
| $d_4 = 1.0705$ μm | 282.93° | −13.01° = 25.84° − 38.85° |

Figure 13A:
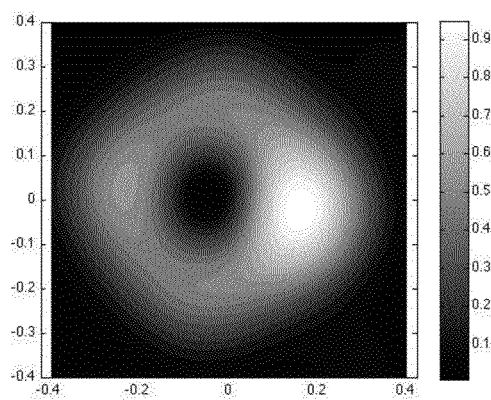
FIGS. 13a and 13b are photographic images illustrating simulation results of the erase and pump spot intensity distributions in a geometrical focal plane by means of the single-layer two-color spiral phase plate having optical properties shown in Table 4.
Figure 13B:
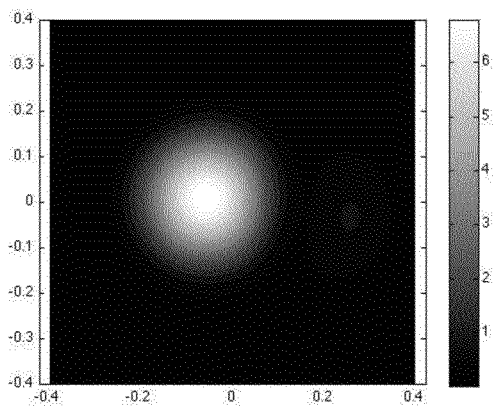

By comparing Tables 1 and 4, it can be seen that the thicknesses of the fabricated single-layer two-color spiral phase plate 15 have rather large deviations from the designed values (on the surface areas S2 and S3, the deviations were considerably larger than $\lambda_e/10$), leading to serious aberrations in both the erase and pump beams. FIGS. 13a and 13b show photographic images of the intensity distributions of the calculated erase and pump spots in the geometrical focal plane based on the experimental data of Table 4.

As is clear from FIGS. 13a and 13b, the fabrication errors of the single-layer two-color spiral phase plate 15 caused the central dark point of the erase spot to be displaced along the x-axis from the geometrical focus. However, the maximum intensity location of the pump spot is also displaced in the same direction by approximately the same amount. As a result, the super-resolution microscope makes it possible to yield a good super-resolved fluorescence performance, in spite of rather large fabrication errors in the single-layer two-color spiral phase plate 15.

Further, we numerically simulated the super-resolution performance of the super-resolution microscope of FIG. 8 that uses the single-layer two-color spiral phase plate 15 of Table 4. For the calculations we assumed a sample consisting of a homogeneous array of randomly oriented Nile Red molecules as a sample 21. The fluorescent spot was calculated using the vectorial model for the fluorescence depletion process and assuming a Lorentzian depletion ratio function. The maximum intensity of the erase spot was chosen to be 8 MW/cm$^2$, in accordance with the experimental value above.

Figure 14A:
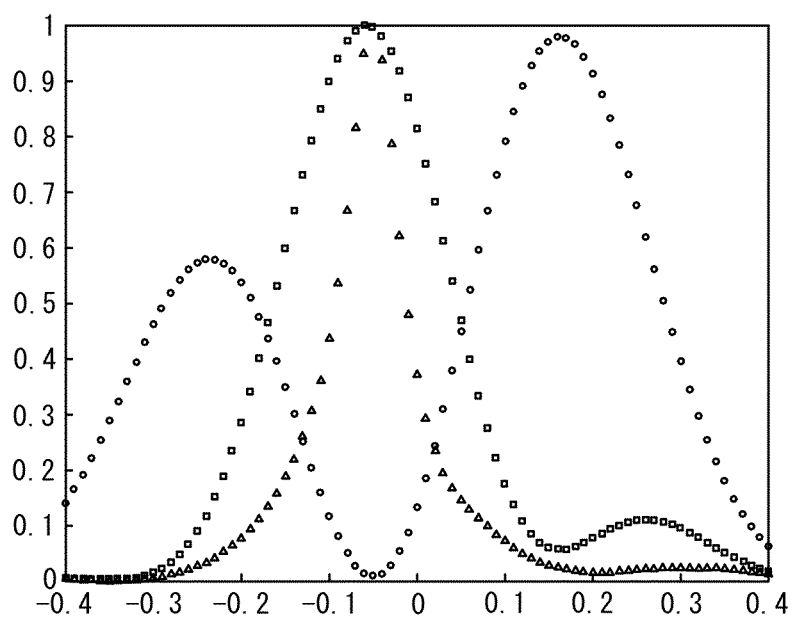
FIGS. 14a and 14b are diagrams illustrating simulation results of super-resolution performance of the super-resolution microscope using the single-layer two-color spiral phase plate having optical properties shown in Table 4.
Figure 14B:
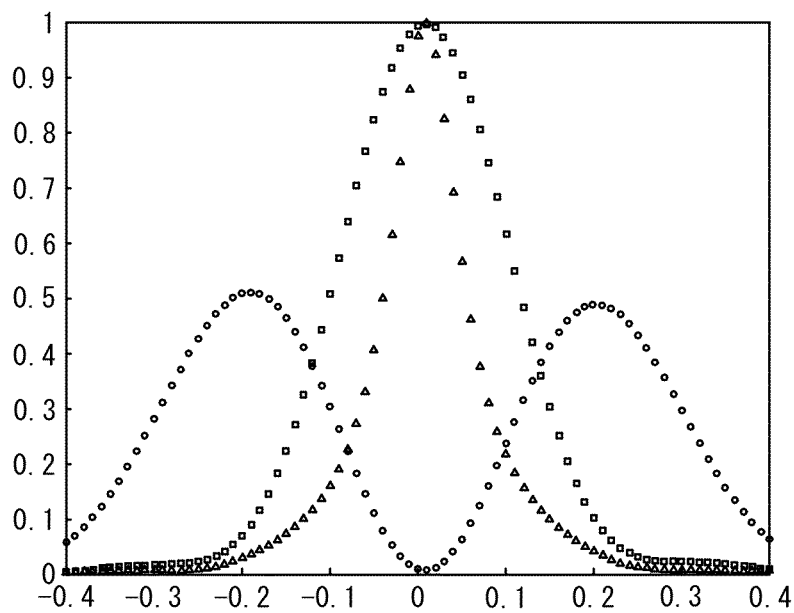

FIGS. 14a and 14b illustrate the calculated cross sectional profiles for the erase spot (E), the pump spot (P), and the super-resolution fluorescence spot (F) along the x- and y-directions, respectively, in the meridional planes that contain the central dark point of the erase spot (which is at about (−50) nm in the x-direction and about 10 nm in the y-direction). In FIGS. 14a and 14b, a distance (μm) with the optical axis at zero is given on the abscissa and a normalized intensity is given on the ordinate.

As is clear from FIG. 14a, even though the intensity profile of the erase spot is highly non-symmetrical, the super-resolved fluorescence spot has a Lorentzian shape and is located symmetrically with respect to the Gaussian pump spot. This result illustrates the fact that—due to the strongly nonlinear dependence of fluorescence depletion on the erase intensity—the super-resolution performance of the microscope system is fairly insensitive to the actual profile of the erase spot, as long as the erase spot has a tightly focused dark point in the center and is surrounded by light in all directions.

In FIGS. 14a and 14b, the calculated FWHM sizes of the fluorescence spot are about 82 nm and about 96 nm along the x- and y-directions, respectively, in good agreement with the experimental results of FIGS. 12a and 12b. Also note that, as is clear from FIGS. 14a and 14b, in spite of the rather large fabrication errors in our experimental single-layer two-color spiral phase plate 15, the central dark point of the erase spot has nearly zero intensity. The calculated intensity of the central dark point (at about (−50) nm in the x-direction and about 10 nm in the y-direction) is only 0.8% of the maximum intensity of the bright doughnut-shaped erase spot. The measured erase spot intensity profile shown in FIG. 10b exhibits a residual intensity of about 15% of the maximum intensity in the central dark region. This effect is due to the fact that FIG. 10b is the convolution of the actual erase spot intensity distribution with the fluorescence distribution of a 200 nm diameter spherical bead.

Figure 15:
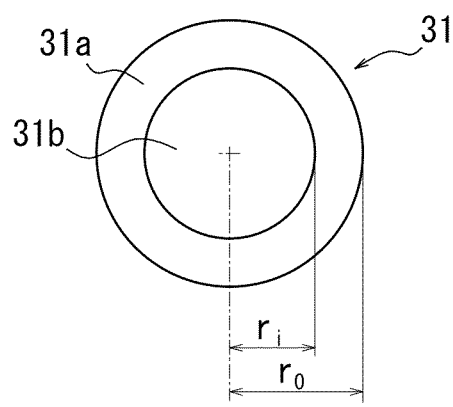
FIG. 15 is a diagram for explaining a configuration of an annular single-layer two-color phase plate used for a super-resolution microscope according to another embodiment.

FIG. 15 is a diagram for explaining a configuration of an annular single-layer two-color phase plate used for a super-resolution microscope according to another embodiment of the present invention. This annular single-layer two-color phase plate 31 is a π phase plate for 3D super-resolution and arranged in the super-resolution microscope shown in FIG. 8 instead of the single-layer two-color spiral phase plate 15. The annular single-layer two-color phase plate 31 has a circular modulation area 31b formed in the center of an optical substrate 31a such as a circular glass substrate. The modulation area 31b consists of a monolayer optical thin film deposited on the optical substrate 31a. The thickness dc of the optical thin film is optimized to give a phase shift of 180° (mod 360°) for the erase beam at the wavelength $\lambda_e$, but a phase shift of 0° (mod) 360° for the pump beam at the wavelength $\lambda_p$.

Since the super-resolution performance depends primarily on the intensity pattern of the erase spot, a small deviation from 0° at $\lambda_p$ is permitted, as long as the aberration introduced into the pump spot is not too large. The radius $r_i$ of the modulation area 31b and the radius $r_o$ of the optical substrate 31a are optimized numerically to yield a perfect zero intensity at the focal point at $\lambda_e$. Note that $r_i/r_o$ is not exactly equal to $1/(2^{1/2})$, for the following two reasons:
(1) the illumination usually has a Gaussian intensity, not a uniform intensity; and
(2) vectorial effects at high NA focusing (for details, see: Bokor, Davidson: "Tight parabolic dark spot with high NA focusing with a circular Pi phase plate", Opt. Comm. 270 (2007), 145-150).

The inventors carried out simulations of the thickness dc of the multilayer optical thin film formed in the modulation area 31b. The parameters used in the calculation are $\lambda_e$=0.647 μm and $\lambda_p$=0.532 μm. The optical substrate 31a is the BK7 glass substrate. For the optical thin film of $SiO_2$, $n_e$=1.45665 and $n_p$=1.4608.

Here, the condition that dc must satisfy is:

$$(360/\lambda_e)*(n_e-1)*dc=(2*k+1)*180, \quad (4)$$

where k is an integer. This condition corresponds to a phase shift of 180° (mod) 360° at $\lambda_e$. Possible values for the thickness dc satisfying equation (4) with k=0, 1, 2, ... 10 are given in Table 5:

TABLE 5

| k | thickness dc |
|---|---|
| 0 | 0.708 μm |
| 1 | 2.125 μm |
| 2 | 3.542 μm |
| 3 | 4.959 μm |
| 4 | 6.376 μm |
| 5 | 7.793 μm |
| 6 | 9.209 μm |
| 7 | 10.626 μm |
| 8 | 12.043 μm |
| 9 | 13.460 μm |
| 10 | 14.877 μm |

At a given thickness dc, the phase shift $\Phi_p$ given by the monolayer optical thin film to the pump beam is as follows:

$$\Phi_p=(360/\lambda_p)*(n_p-1)*dc \quad (5)$$

Figure 16:
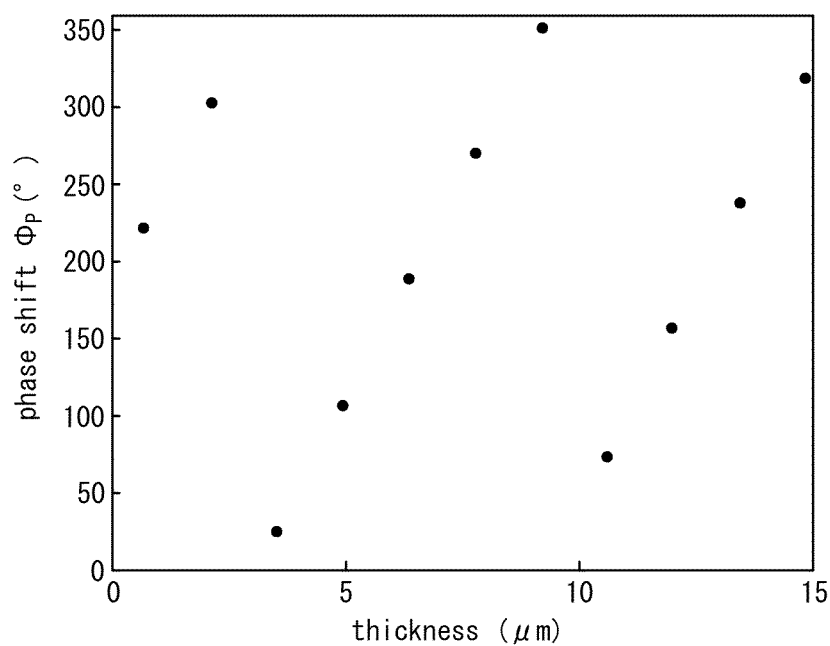
FIG. 16 is a diagram illustrating a thickness of an optical thin film in a modulation area and a phase shift given to a pump beam of the annular single-layer two-color phase plate in FIG. 15.

The question regarding (5) is: for which thickness dc does equation (5) give a $\Phi_p$ that is close to 0° (mod 360°). FIG. 16 is a plot of the relationship between $\Phi_p$ and dc according to equation (5), with the thickness dc (μm) of the optical thin film given on the abscissa and the phase shift $\Phi_p$ (°) given on the ordinate.

The best two candidates for the thickness dc of the optical thin film based on the requirement for a low-aberration pump spot are:
Case 1 dc=3.542 μm; $\Phi_p$=24.5°
Case 2 dc=9.209 μm; $\Phi_p$=351.7° (=−8.3°)

Case 1 has the advantage that some small aberration can be introduced into the pump spot and the optical thin film has a small thickness dc and is relatively easy to fabricate. For Case 2, an aberration introduced into the pump spot can be much smaller, but the thickness dc of the optical thin film is somewhat larger.

In order to consider the aberration of the pump spot in more detail, the inventors carried out simulations of both the pump and erase beams circularly polarized and focused by the oil immersion aplanatic objective lens with NA=1.4 (refractive index of 1.5). For simplicity we assumed a uniform plane wave intensity (i.e. not a Gaussian intensity) for both the erase and pump beams.

Figure 17:
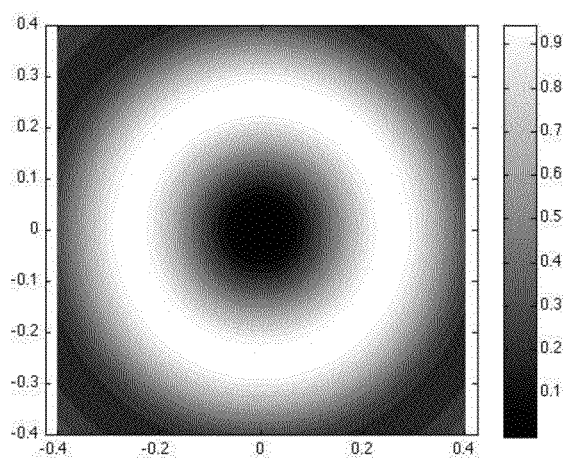
FIG. 17 is a photographic image illustrating a simulation result of an erase spot intensity distribution when the annular single-layer two-color phase plate in FIG. 15 works as a complete π phase plate at an erase wavelength.

First, $r_i/r_o$ was numerically optimized to yield perfect destructive interference for the erase spot at the focal point. The optimized value is $r_i/r_o$=0.715 (close to, but not exactly equal to, $1/(2^{1/2})$, the value obtained from scalar diffraction). FIG. 17 is a photographic image illustrating a simulation result of the erase spot intensity distribution for all the thicknesses dc listed in Table 5, i.e. when the annular single-layer two-color phase plate 31 works as a perfect π phase plate at $\lambda_e$.

Table 6 shows a simulation result of the phase shift $\Phi_p$ given to the pump beam at all the thicknesses dc listed in Table 5. FIGS. 18 to 28 are photographic images illustrating simulation results of the corresponding pump spot intensity distributions.

TABLE 6

Figure 18:
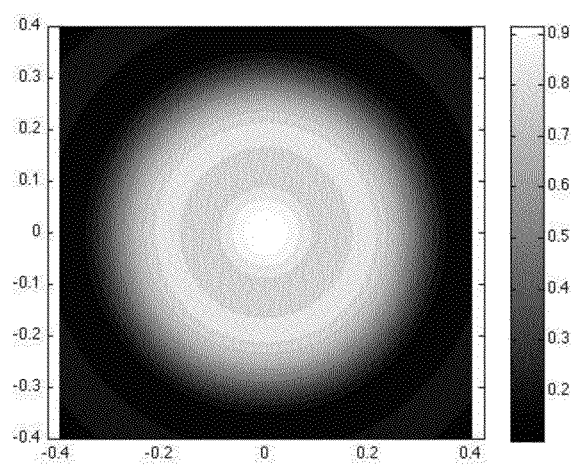
FIG. 18 is a photographic image illustrating a simulation result of the pump spot intensity distribution when the monolayer optical thin film of the modulation area of the annular single-layer two-color phase plate in FIG. 15 has a thickness of 0.708 μm.
Figure 19:
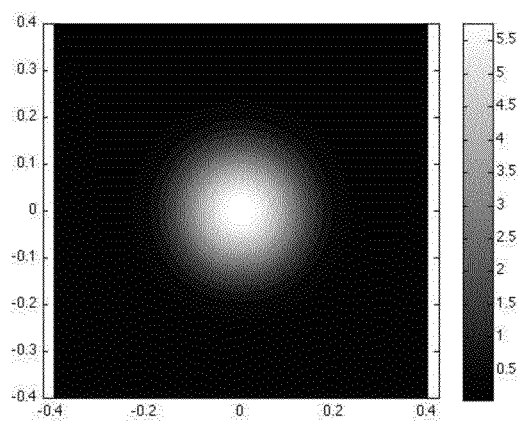
FIG. 19 is a photographic image illustrating a simulation result of the pump spot intensity distribution when the monolayer optical thin film of the modulation area of the annular single-layer two-color phase plate in FIG. 15 has a thickness of 2.125 μm.
Figure 20:
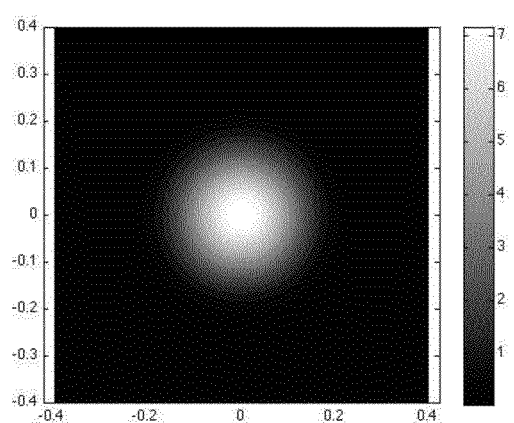
FIG. 20 is a photographic image illustrating a simulation result of the pump spot intensity distribution when the monolayer optical thin film of the modulation area of the annular single-layer two-color phase plate in FIG. 15 has a thickness of 3.542 μm.
Figure 21:
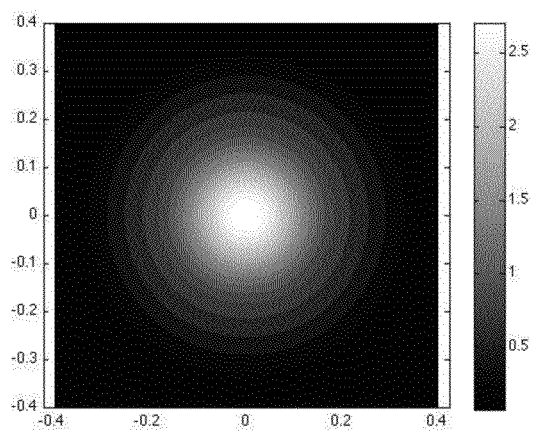
FIG. 21 is a photographic image illustrating a simulation result of the pump spot intensity distribution when the monolayer optical thin film of the modulation area of the annular single-layer two-color phase plate in FIG. 15 has a thickness of 4.959 μm.
Figure 22:
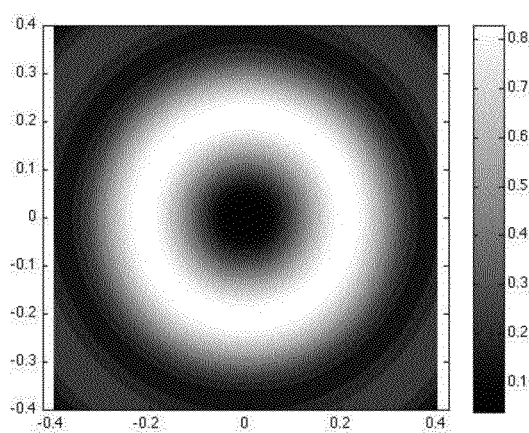
FIG. 22 is a photographic image illustrating a simulation result of the pump spot intensity distribution when the monolayer optical thin film of the modulation area of the annular single-layer two-color phase plate in FIG. 15 has a thickness of 6.376 μm.
Figure 23:
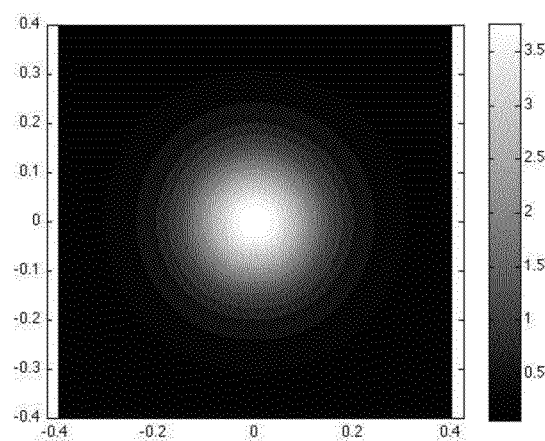
FIG. 23 is a photographic image illustrating a simulation result of the pump spot intensity distribution when the monolayer optical thin film of the modulation area of the annular single-layer two-color phase plate in FIG. 15 has a thickness of 7.793 μm.
Figure 24:
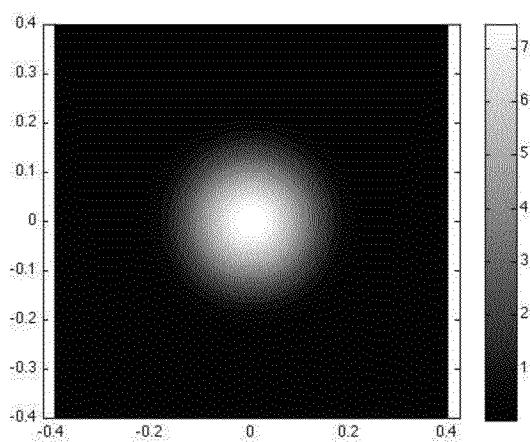
FIG. 24 is a photographic image illustrating a simulation result of the pump spot intensity distribution when the monolayer optical thin film of the modulation area of the annular single-layer two-color phase plate in FIG. 15 has a thickness of 9.209 μm.
Figure 25:
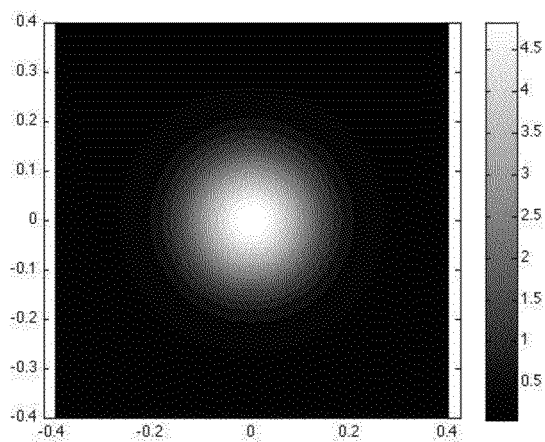
FIG. 25 is a photographic image illustrating a simulation result of the pump spot intensity distribution when the monolayer optical thin film of the modulation area of the annular single-layer two-color phase plate in FIG. 15 has a thickness of 10.626 μm.
Figure 26:
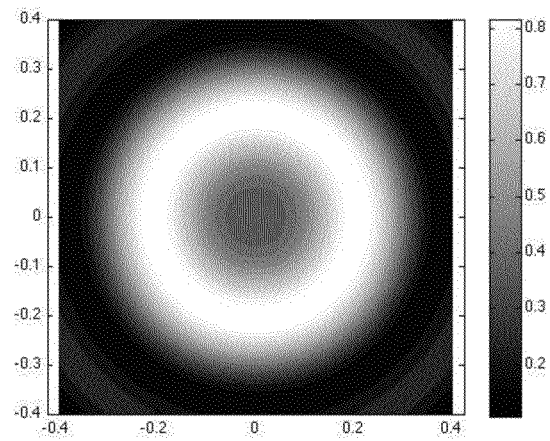
FIG. 26 is a photographic image illustrating a simulation result of the pump spot intensity distribution when the monolayer optical thin film of the modulation area of the annular single-layer two-color phase plate in FIG. 15 has a thickness of 12.043 μm.
Figure 27:
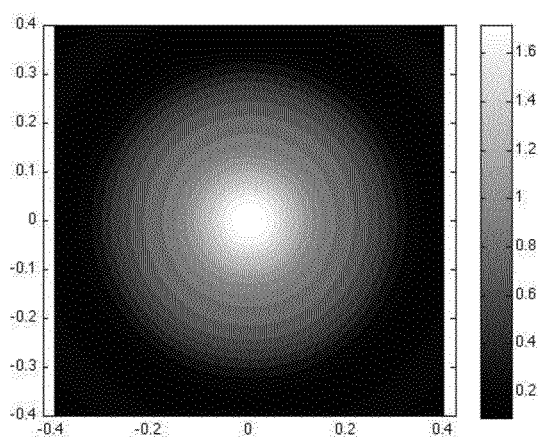
FIG. 27 is a photographic image illustrating a simulation result of the pump spot intensity distribution when the monolayer optical thin film of the modulation area of the annular single-layer two-color phase plate in FIG. 15 has a thickness of 13.460 μm.
Figure 28:
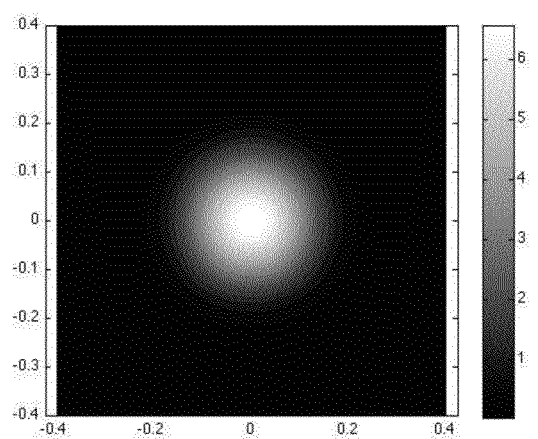
FIG. 28 is a photographic image illustrating a simulation result of the pump spot intensity distribution when the monolayer optical thin film of the modulation area of the annular single-layer two-color phase plate in FIG. 15 has a thickness of 14.877 μm.

| thickness dc | $\Phi_p$ | intensity distribution image |
| --- | --- | --- |
| 0.708 μm | 220.9° | FIG. 18 |
| 2.125 μm | 302.7° | FIG. 19 |
| 3.542 μm | 24.5° | FIG. 20 |
| 4.959 μm | 106.3° | FIG. 21 |
| 6.376 μm | 188.1° (this thickness works almost as a π phase plate at $\lambda_p$) | FIG. 22 |
| 7.793 μm | 269.9° | FIG. 23 |
| 9.209 μm | 351.7° | FIG. 24 |
| 10.626 μm | 73.5° | FIG. 25 |
| 12.043 μm | 155.3° | FIG. 26 |
| 13.460 μm | 237.1° | FIG. 27 |
| 14.877 μm | 318.9° | FIG. 28 |

In conclusion, the above results are very promising. Even relatively thin monolayers (e.g. dc=2.125 μm or 3.542 μm) give a pump spot with low aberration (as well as a perfect dark erase spot). The annular single-layer two-color phase plate 31 could be used very efficiently as a π phase plate in a 3D super-resolution microscope. This makes it possible to create the pump and erase spots with necessary intensity profiles for the super-resolution fluorescence depletion microscope.

The above-described design principle was experimentally verified in a simple setup based on a commercially available scanning microscope system. Note that, the thickness of each surface area of the single-layer two-color spiral phase plate and the thickness of the optical thin film in the modulation area of the single-layer two-color phase plate described above are not an intrinsic limitation in the present invention. By applying the single-layer two-color spiral phase plate or the annular single-layer two-color phase plate described above to a commercially available microscope, it is possible to construct a super-resolution microscope which can achieve the desired spatial resolution without any reduction in detection sensitivity.

It should be noted that the present invention is not limited to the above-mentioned embodiments, but a wide variety of changes and modifications are possible. For example, the phase plate is not limited to the annular single-layer two-color phase plate including a surface area divided into four sections shown in FIG. 1, but can include a surface area divided into two or more sections. Further, the phase plate can be configured to have a similar function as the single-layer two-color spiral phase plate in FIG. 1 by etching the surface of the optical substrate such as glass in accordance with the surface areas to be divided. In this case, each surface area is etched to a thickness satisfying the following conditional equation.

$$\frac{2\pi}{\lambda_e}(n_e - 1) \cdot d_i = \frac{2i\pi}{M} + 2m_i\pi$$

$$\frac{2\pi}{\lambda_p}(n_p - 1) \cdot d_i = \Psi_i + 2l_i\pi$$

$$|\Psi_i| \leq \frac{\pi}{4}$$

where $d_i$ is the thickness of the substrate that remains after etching of the ith surface area, with the surface area which is the most deeply etched being a base level, $\lambda_p$ is the pump wavelength, $\lambda_e$ is the erase wavelength, $n_p$ is the refractive index of the pump beam in the optical substrate, $n_e$ is the refractive index of the erase beam in the optical substrate, $m_i$ and $l_i$ are integers characterizing the thickness of the substrate that remains after etching of the ith surface area, and $\Psi$ represents a constant phase shift.

Further, the annular single-layer two-color phase plate 31 shown in FIG. 15 can be configured to have the thickness dc of the optical thin film of the modulation area 31b that gives a phase shift of 180° (mod 360°) for the erase beam at the wavelength $\lambda_e$, but reflects the pump beam at the wavelength $\lambda_p$. The scanning section that scans the sample 21 can be configured to scan the sample 21 by moving the sample stage 20 or to scan the sample 21 by relatively displacing the pump and erase beams and the sample stage 20.

REFERENCE SIGNS LIST 1 single-layer two-color spiral phase plate
S1 to S4 surface area
11 single-mode fiber
12 collimator lens
13 quarter-wave plate
14 polarization beam splitter
15 single-layer two-color spiral phase plate
16, 17 galvano mirror
18 pupil projection lens system
19 objective lens
20 sample stage
21 sample
22 fluorescence separation filter
23 condenser lens
24 confocal pinhole
25 light detection section
31 annular single-layer two-color phase plate
31a optical substrate
31b modulation area

The invention claimed is:

1. A super-resolution microscope for observing a sample containing a molecule having at least two or more excited quantum state comprising:

an illumination optical system that condenses a first illumination light beam for exciting the molecule from a stable state to a first quantum state and a second illumination light beam for further transitioning the molecule to another quantum state onto a sample in a manner that the first illumination light beam and the second illumination light beam are partially overlapped with each other so as to irradiate the sample with the first illumination light beam and the second illumination light beam;

a scanning section that scans the sample by relatively displacing the first illumination light beam and the second illumination light beam and the sample;

a detection section that detects an optical response signal emitted from the sample in response to irradiation of the first illumination light beam and the second illumination light beam; and a phase plate that is arranged in an optical path of the illumination optical system through which the first illumination light beam and the second illumination light beam pass and has a plurality M of surface areas for modulating the phase of at least a portion of the second illumination light beam, wherein the phase plate comprises a monolayer optical thin film with the plurality M of surface areas formed on an optical substrate in a thickness that satisfies the following conditional expression:

$$\frac{2\pi}{\lambda_e}(n_e - 1) \cdot d_i = \frac{2i\pi}{M} + 2m_i\pi$$

-continued $$\frac{2\pi}{\lambda_p}(n_p - 1) \cdot d_i = \Psi_i + 2l_i\pi$$

$$|\Psi_i| \leq \frac{\pi}{4}$$

where $d_i$ is the thickness of the optical thin film formed on the ith surface area, $\lambda_p$ is the first illumination light beam wavelength, $\lambda_e$ is the second illumination light beam wavelength, $n_p$ is the refractive index of the first illumination light beam in the optical thin film, $n_e$ is the refractive index of the second illumination light beam in the optical thin film, $m_i$ and $l_i$ are integers characterizing the thickness of the optical thin film formed on the jth surface area, and $\Psi$ represents a constant phase shift.

2. A super-resolution microscope according to claim 1, further comprising a wave plate rotatable around an optical axis independently from the phase plate or jointly with the phase plate as a unit.

3. A super-resolution microscope according to claim 2, wherein the phase plate is a quarter phase plate and the second illumination light is linearly-polarized.

4. A super-resolution microscope for observing a sample containing a molecule having at least two or more excited quantum state comprising:
   an illumination optical system that condenses a first illumination light beam for exciting the molecule from a stable state to a first quantum state and a second illumination light beam for further transitioning the molecule to another quantum state onto a sample in a manner that the first illumination light beam and the second illumination light beam are partially overlapped with each other so as to irradiate the sample with the first illumination light beam and the second illumination light beam;
   a scanning section that scans the sample by relatively displacing the first illumination light beam and the second illumination light beam and the sample;
   a detection section that detects an optical response signal emitted from the sample in response to irradiation of the first illumination light beam and the second illumination light beam; and
   a phase plate that is arranged in an optical path of the illumination optical system through which the first illumination light beam and the second illumination light beam pass and has a plurality M of surface areas for modulating the phase of at least a portion of the second illumination light beam,
   wherein the phase plate is formed by etching an optical substrate to have the plurality M of surface areas with a thickness that satisfies the following conditional expression:

$$\frac{2\pi}{\lambda_e}(n_e - 1) \cdot d_i = \frac{2i\pi}{M} + 2m_i\pi$$

$$\frac{2\pi}{\lambda_p}(n_p - 1) \cdot d_i = \Psi_i + 2l_i\pi$$

$$|\Psi_i| \leq \frac{\pi}{4}$$

where $d_i$ is the thickness of the substrate that remains after etching of the ith surface area, with the surface area which is the most deeply etched being a base level, $\lambda_p$ is the first illumination light beam wavelength, $\lambda_e$ is the second illumination light beam wavelength, $n_p$ is the refractive index of the first illumination light beam in the optical substrate, $n_e$ is the refractive index of the second illumination light beam in the optical substrate, $m_i$ and $l_i$ are integers characterizing the thickness of the substrate that remains after etching of the ith surface area, and $\Psi$ represents a constant phase shift.

5. A super-resolution microscope according to claim 4, further comprising a wave plate rotatable around an optical axis independently from the phase plate or jointly with the phase plate as a unit.

6. A super-resolution microscope according to claim 5, wherein the phase plate is a quarter phase plate and the second illumination light is linearly-polarized.

* * * * *